C. P. WOODFORD.
TILTING MECHANISM FOR AUTOMOBILE HEADLIGHTS.
APPLICATION FILED MAR. 25, 1921.

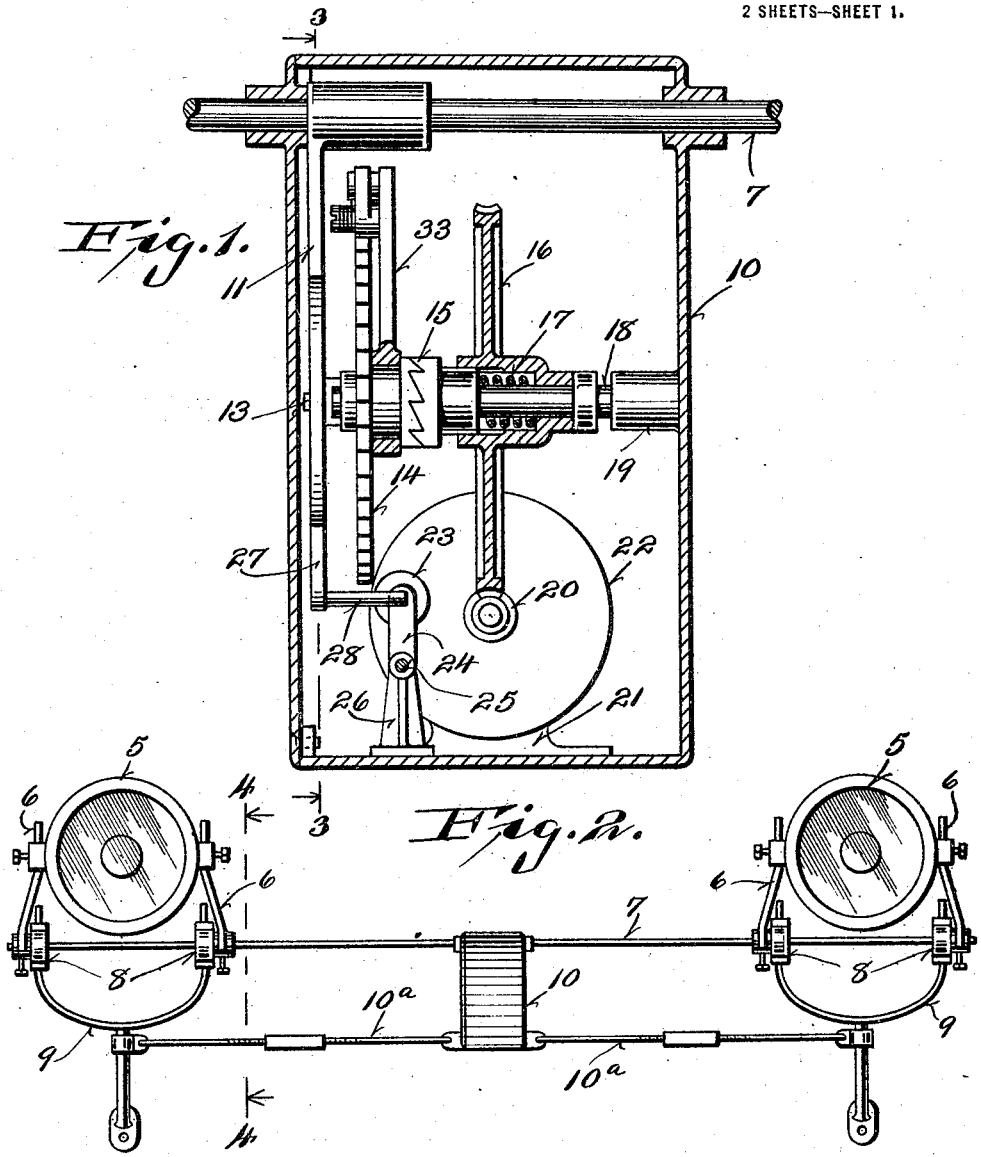

1,418,769.

Patented June 6, 1922.
2 SHEETS—SHEET 2.

Inventor
Charles P. Woodford

UNITED STATES PATENT OFFICE.

CHARLES PEARL WOODFORD, OF SPOONER, WISCONSIN.

TILTING MECHANISM FOR AUTOMOBILE HEADLIGHTS.

1,418,769.  Specification of Letters Patent.  Patented June 6, 1922.

Application filed March 25, 1921. Serial No. 455,633.

*To all whom it may concern:*

Be it known that I, CHARLES PEARL WOODFORD, a citizen of the United States, and resident of Spooner, in the county of Washburn and State of Wisconsin, have invented certain new and useful Improvements in Tilting Mechanism for Automobile Headlights; and I do hereby declare that the following is a full, clear, and exact description thereof.

This invention relates to a tilting mechanism, which is more especially adapted for use in connection with headlights commonly used for automobiles.

One important object of the invention is to construct a practical device of this kind, which may be quickly and easily operated to tilt the headlights including the reflectors, so as to throw the rays of light downwardly to prevent the glare which is one of the objectionable features of such headlights, or to tilt the same in the opposite direction to throw the rays of light directly ahead when there is no approaching vehicle in sight.

A further object of the invention is to provide means for automatically stopping the tilting movement when the headlights have reached the limit of their movement in either direction.

With the foregoing and other objects in view, my invention comprises certain structural features which will be fully explained in connection with the accompanying drawings, in which:

Figure 1 is a vertical transverse sectional view through the tilting mechanism.

Figure 2 is a front elevation showing the general relation of the tilting mechanism to the headlights.

Figure 3:
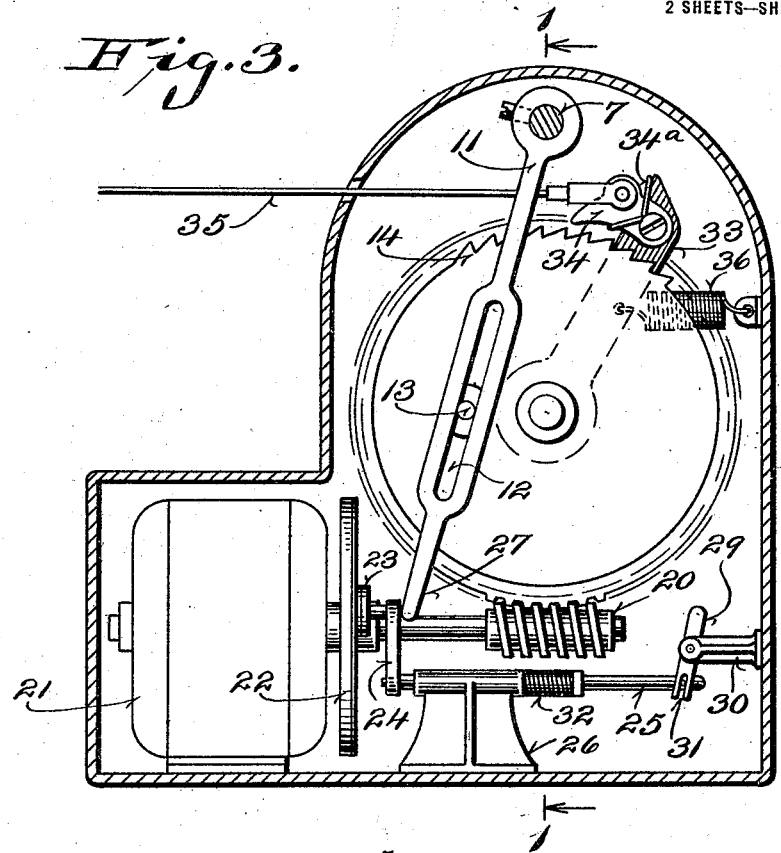
Figure 3 is a vertical sectional view on the line 3—3 of Figure 1.
Figure 4:
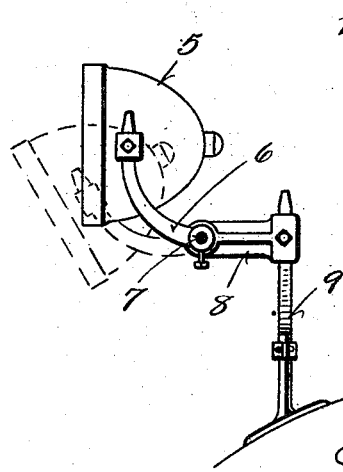
Figure 4 is a longitudinal sectional view on the line 4—4 of Figure 2.

Referring more specifically to the structure shown in the drawings, the numeral 5 designates the headlights which are mounted on the arms 6 which are adjustably secured to the transverse rod 7. The rod 7 extends across the front of the automobile or other vehicle to which the headlights are to be attached, and is rotatably secured in the arms 8 which project forwardly from the brackets 9 secured to some portion of the vehicle.

The rod 7 extends through the housing 10, which may, if desired, be secured to the front portion of the vehicle and braced by the adjustable rods 10ª which extend therefrom to the brackets 9. This housing contains a mechanism for rocking the rod 7, and thereby tilting the headlights. This mechanism comprises an arm 11, which is secured to the rod 7 within the housing and is provided with a slot 12 which receives a pin 13 carried by a ratchet wheel 14, which may be driven by the ratchet hub 15. This hub is keyed to rotate with the worm gear 16, and is yieldably held in engagement with the hub of the ratchet wheel 14, by the expansile spring 17, which is enclosed within the hub of the worm gear.

The ratchet wheel and worm gear are supported on the stub shaft 18, which is carried by the boss 19, which is secured on the housing 10. The worm gear 16 is operatively connected to the worm 20 which is driven by the motor 21.

The worm gear shaft carries a disk 22 which is adapted to be engaged by a brake shoe 23 carried on the arm 24 which is secured to a shaft 25. This shaft is slidably supported by a bracket 26, which is supported on the lower wall of the housing.

The arm 11 is extended at its lower end as shown at 27, and provided with a laterally extending pin 28 which engages the arm 24 and carries the brake shoe 23 into engagement with the disk 22, when the arm 11 reaches the forward limit of its movement. At the rear end of the shaft 25, a lever 29 is pivotally supported in a bracket 30, and has a pin and slot connection 31 with the end of the shaft 25. When the arm 11 swings backwardly to the limit of its rearward motion, the pin 28 strikes the projecting end of the lever 29 and advances the shaft 25 so that the brake shoe 23 engages the disk 22 in the same manner as it did upon the forward movement of the arm 11. The shaft 25 is returned to its rearward position by the spring 32.

Since the motor may some times get out of order, or for some other reason it may be desirable to tilt the headlights manually I provide an arm 33 which is journalled on the hub of the ratchet wheel 14. This arm is provided with a dog 34 which is normally held out of engagement with the teeth of the ratchet wheel by a small spring 34ª. A rod 35 or the like, extends from the dog 34 to a point within reach of the driver, When it is desired to operate the tilting mechanism manually the driver pulls on the member 35. This pull first overcomes the resistance of the spring 34ª and engages the dog with the teeth of the ratchet wheel 14. Upon further pull the wheel is rotated and upon releasing the member 35, the arm 33 is returned to its normal position by the spring 36.

In the operation of my device, the tilting mechanism is set in operation either by operating the motor 21 or by manually swinging the arm 33 by means of the member 35. In case the mechanism is set in operation manually, it will be noted that the ratchet wheel 14 is rotated forwardly without moving the worm gear 16 since the ratchet hub 15 is longitudinally slidable on the shaft 18 in opposition to the spring 17 which allows the teeth on the ratchet wheel hub to slip past the teeth on the hub 15. After the tilting mechanism has been set in operation, the power is turned off or the member 35 released, as the case may be, and the inertia of the mechanism carries it forward until the brake shoe 23 engages the disk 22, whereupon the movement of the headlights is brought to an end with the latter at one extreme position or the other, as desired.

From the foregoing description, it will be seen that I have provided a mechanism which can instantly be set in operation upon the approach of another vehicle to tilt the headlights downwardly, and may just as readily be set in operation to restore the headlights to the original position after the vehicle has passed.

While I have described one specific embodiment of my invention, it will be understood that various modifications may be made in the structural details, within the scope of what is claimed, without departing from the spirit of the invention.

I claim as my invention:

1. In a device of the character described, a rock shaft, headlights supported thereon, an arm secured on said shaft and having a slot therein, a rotary member, a pin carried thereon and engaging said slot, means for rotating said rotary member, and means for automatically applying a brake to the first mentioned means when said arm approaches the limit of its movement in either direction.

2. In a device of the character described, a rock shaft, headlights mounted thereon, said rock shaft having an arm secured thereto, a slot in said arm, a rotary member having a pin thereon which engages the slot to rock said arm and said rock shaft upon rotation of the rotary member, motor driven means for rotating said rotary member, and a brake engageable with said motor driven means and actuated by said arm upon a predetermined movement of said arm.

In testimony that I claim the foregoing I have hereunto set my hand at Spooner in the county of Washburn and State of Wisconsin.

CHARLES PEARL WOODFORD.